US010693214B2

(12) United States Patent
Kim et al.

(10) Patent No.: US 10,693,214 B2
(45) **Date of Patent: *Jun. 23, 2020**

(54) MOBILE TERMINAL

(71) Applicant: LG ELECTRONICS INC., Seoul (KR)

(72) Inventors: Dongjin Kim, Seoul (KR); Yunmo Kang, Seoul (KR); Youngbae Kwon, Seoul (KR); Yeomin Youn, Seoul (KR); Jihun Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,760

(22) Filed: Aug. 2, 2019

(65) Prior Publication Data

US 2019/0356040 A1 Nov. 21, 2019

Related U.S. Application Data

(63) Continuation of application No. 16/020,925, filed on Jun. 27, 2018, now Pat. No. 10,431,872.

(Continued)

(30) Foreign Application Priority Data

May 3, 2018 (KR) ........................ 10-2018-0051313

(51) Int. Cl.
*H01Q 1/24* (2006.01)
*H01Q 13/10* (2006.01)

(Continued)

(52) U.S. Cl.
CPC ............. *H01Q 1/242* (2013.01); *H01Q 1/243* (2013.01); *H01Q 9/42* (2013.01); *H01Q 13/10* (2013.01);

(Continued)

(58) Field of Classification Search
CPC ........ H01Q 1/242; H01Q 21/30; H01Q 13/10; H04B 1/401

(Continued)

(56) References Cited

U.S. PATENT DOCUMENTS 10,431,872 B1 * 10/2019 Kim ....................... H01Q 1/242
2010/0033381 A1 2/2010 Liu et al.

(Continued)

FOREIGN PATENT DOCUMENTS

JP 5712361 5/2015
KR 10-2008-0063506 7/2008
KR 10-2018-0024674 3/2018

OTHER PUBLICATIONS

European patent application No. 18196609.4, European search report dated Dec. 14, 2018, 7 pages.

(Continued)

*Primary Examiner* — Ayodeji O Ayotunde
(74) *Attorney, Agent, or Firm* — Lee, Hong Degerman, Kang & Waimey

(57) ABSTRACT

A mobile terminal is provided including a display unit; a middle frame including a supporting unit that supports a rear surface of the display unit with a side portion around the supporting portion; a main board at a rear surface of the middle frame including a ground; a first wireless communication unit in the main board to transceive a first signal; a second wireless communication unit in the main board to transceive a second signal; and a rear case covering a rear surface of the main board, where the side portion includes a plurality of conductive members with ends divided into slits and the plurality of the conductive members includes a common antenna electrically connectable with the first and second wireless communication units to receive the first and second signals such that the mobile terminal receives dif- (Continued)

ferent signals with antennas for LTE and 5G communication arranged in a limited space.

20 Claims, 12 Drawing Sheets

Related U.S. Application Data

(60) Provisional application No. 62/653,548, filed on Apr. 5, 2018.

(51) Int. Cl.

| | |
|---|---|
| ***H01Q 21/30*** | (2006.01) |
| ***H04B 1/401*** | (2015.01) |
| ***H04M 1/02*** | (2006.01) |
| ***H01Q 21/28*** | (2006.01) |
| ***H01Q 9/42*** | (2006.01) |

(52) U.S. Cl.
CPC ............ *H01Q 21/28* (2013.01); *H01Q 21/30* (2013.01); *H04B 1/401* (2013.01); *H04M 1/0202* (2013.01); *H04M 1/026* (2013.01); *H04M 1/0266* (2013.01)

(58) Field of Classification Search
USPC .................................... 455/82, 550.1, 552.1
See application file for complete search history.

(56) References Cited

U.S. PATENT DOCUMENTS

| | | | |
|---|---|---|---|
| 2012/0235866 | A1 | 9/2012 | Kim et al. |
| 2015/0002350 | A1 | 1/2015 | Vance et al. |
| 2015/0031287 | A1 | 1/2015 | Pang et al. |
| 2015/0036656 | A1 | 2/2015 | McCarthy et al. |
| 2016/0119942 | A1 | 4/2016 | Wang |
| 2017/0062953 | A1 | 3/2017 | Teshima et al. |
| 2017/0201010 | A1 | 7/2017 | Kim et al. |
| 2018/0005134 | A1 | 1/2018 | Kish et al. |
| 2018/0026337 | A1 | 1/2018 | Chen et al. |
| 2018/0227960 | A1 | 8/2018 | Belghoul et al. |

OTHER PUBLICATIONS

PCT International Application No. PCT/KR2018/007335, International Search Report and Written Opinion of the International Search Authority dated Jan. 4, 2019, 9 pages.

United States Patent and Trademark Office U.S. Appl. No. 16/020,925, Notice of Allowance dated May 3, 2019, 14 pages.

United States Patent and Trademark Office U.S. Appl. No. 16/020,925, Office Action dated Oct. 31, 2018, 10 pages.

Korean Intellectual Property Office Application No. 10-2018-0051313, Office Action dated Jun. 10, 2019, 4 pages.

* cited by examiner

LTE (M / H) 4x4 MIMO
Ant 3 (M / H)
Ant 2 (M / H)
SDR855
PR X
DRX
RX 3rd
RX 4th
TX
Ant 1 (M / H)
Ant 4 (M / H)
(a)
LTE (M / H) 4x4 MIMO
N78 4x4 MIMO
Ant 3 (M / H / N78)
Ant 2 (M / H / N78)
110b
SDR855
B7 PRX
B7 DRX
B7 3rd
B7 4th
B41 TX
110a
SDR054
N78 PRX
N78 DRX
N78 3rd
N78 4th
N78 TX
Ant 1 (M / H / N78)
Ant 4 (M / H / N78)
(b)
LTE (M / H) 4x4 MIMO
N41 4x4 MIMO
Ant 3 (M / H / N78)
Ant 2 (M / H / N78)
110b
SDR855
B41 PRX
B41 DRX
B41 3rd
B41 4th
B41 TX
110a
SDR054
N41 PRX
N41 DRX
N41 3rd
B41 4th
N41 TX
Ant 5 (N41)
Ant 1 (M / H)
Ant 4 (M / H / N78)
(c)

(a)

(b)

(a)

(b)

(a)

(b)

(c)

Ant 1
LTE H
N41 Rx.
N78 Tx
Ant 2
LTE M / H
N41 Rx
N78 Rx
Ant 3
LTE M
N41 Tx
N78 Rx
Ant 4
LTE L / H
N41 Rx / N78 Rx
210
220
230

MOBILE TERMINAL

CROSS-REFERENCE TO RELATED APPLICATIONS

This application is a continuation of U.S. patent application Ser. No. 16/020,925, filed on Jun. 27, 2018, now U.S. Pat. No. 10,431,872 B1, which claims the benefit of U.S. Provisional Application No. 62/653,548, filed on Apr. 5, 2018, and claims the benefit of earlier filing date and right of priority to Korean Application No. 10-2018-0051313, filed on May 3, 2018, the contents of which are all incorporated by reference herein in their entirety.

FIELD OF THE DISCLOSURE

Embodiments of the present disclosure relate to a mobile terminal including an antenna which may be used in 5th generation mobile communication.

RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With such the diversified and expanded functions of the mobile terminal, diverse wireless communication methods are applied to the mobile terminal to facilitate exchange of data wirelessly. The mobile terminal having the diversified functions facilitates the appreciation of UHD image quality files or the use of virtual reality contents via a mobile communication network. Accordingly, there are increasing demands for a technique configured to transceive more data more rapidly.

As a result, there was the advent LTE (Long Term Evolution) communication for transceiving mass data rapidly and such LTE communication has advanced into new techniques having 2× faster transfer speeds such as LTE-A and integrated LTE or the like. To enhance the transfer speeds, two or more frequency bands are used or the frequency bandwidth is increased so as to increase the data transmission amount. The number of the antennas is increased to increase the frequency bandwidth or use signals in different frequency bands at the same time.

There is a limit to the increase of bandwidths or the use of signals in two or more bands. Accordingly, 5th generation mobile communication technique has emerged the 5G mobile communication is advantageous in transceiving mass data and has a fast responding speed, compared with the conventional 4G mobile communication. The 5G mobile communication uses a higher frequency band signal than the 4G mobile communication so that it may requires a totally different type of an antenna.

SUMMARY OF THE INVENTION

Accordingly, an object of the present invention is to address the above-noted and other problems and provide a mobile terminal which includes an antenna for transceiving a signal which will be used in 5th generation mobile communication, together with the a conventional LTE antenna.

Embodiments of the present disclosure may provide a mobile terminal comprising: a display unit; a middle frame comprising a supporting unit which supports a rear surface of the display unit and a side portion provided around the supporting portion to define a lateral external appearance; a main board provided in a rear surface of the middle frame and comprising a ground; a first wireless communication unit loaded in the main board and configured to transceive a first signal; a second wireless communication unit loaded in the main board and configured to transceive a second signal; and a rear case configured to cover a rear surface of the main board, wherein the side portion comprises a plurality of conductive members of which ends are divided into slits, and the plurality of the conductive members comprises a common antenna which is electrically connectable with the first wireless communication unit and the second wireless communication unit and configured to receive the first signal and the second signal.

The first signal may be a NR (New Radio) signal, and the second signal may be a LTE (Long Term Evolution) signal.

The first signal may have a frequency band of 2.5 GHz or more and 6 GHz or less, and the second signal may have a frequency band of 2.7 GHz or less.

The slit may be provided in at least one end of the common antenna.

The slit may comprise at least four slits.

The common antenna may comprise two or more resonance frequencies.

The common antenna may comprise two or more common antennas.

The conductive members may comprise an independent antenna which is electrically connected with the second wireless communication unit and configured to transceive the second signal.

The independent antenna may be provided in a lower area of the mobile terminal, and the mobile terminal may further comprise a cap sensor which is electrically connected with the independent antenna.

The mobile terminal may further comprise a connector hole formed in the independent antenna; and an interface unit provided in the connector hole and having a connector inserted therein.

The mobile terminal may further comprise a RF block provided between the cap sensor and the independent antenna and configured to cut off a RF signal applied to the cap sensor.

The cap sensor and the independent antenna may be electrically connected with each other by using one of a direct connecting method configured to directly connect a signal line connected with the cap sensor with the independent antenna, a coupling connecting method configured to arrange the signal line near the independent antenna, a connecting method configured to connect the cap sensor with a feeding line connected with the second wireless communication unit, and an indirect connecting method configured to connect the cap sensor with a branch pattern connected with the independent antenna.

The mobile terminal may further comprise a branch pattern extended from a feeding line connecting the independent antenna with the second wireless communication unit or connected with the independent antenna.

The independent antenna may comprise a plurality of resonance frequencies.

The feeding line may be connected with the independent antenna in a coupling method.

The independent antenna may form an open slot antenna having one end connected with the supporting portion and the other end having the slit so as to have one open end together with the supporting unit.

The second signal may be received by the independent antenna and the common antenna.

The second signal may be transmitted by the independent antenna.

The independent antenna may be connected with the supporting portion at a first point and the supporting portion or the ground of the main board at a second point and electrically connected with the second wireless communication unit between the first point and the second point, so as to receive the second signal.

The independent antenna may be provided in a left or right lateral area of the mobile terminal.

The length between the first point and the second point may be one half of the wavelength of the second signal.

The mobile terminal may further comprise an array antenna which is provided not to be overlapped with the common antenna and the independent antenna.

The signal received by the array antenna may be mmWave.

According to the embodiment of the present disclosure, the mobile terminal has following effects. The mobile terminal in accordance with the present disclosure may include the common antenna which is connectable with the two or more wireless communication units in the limited area and configured to receive the different signals. Accordingly, the antennas for the LTE communication and the 5G communication may be arranged in the limited space.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Figure 1A:
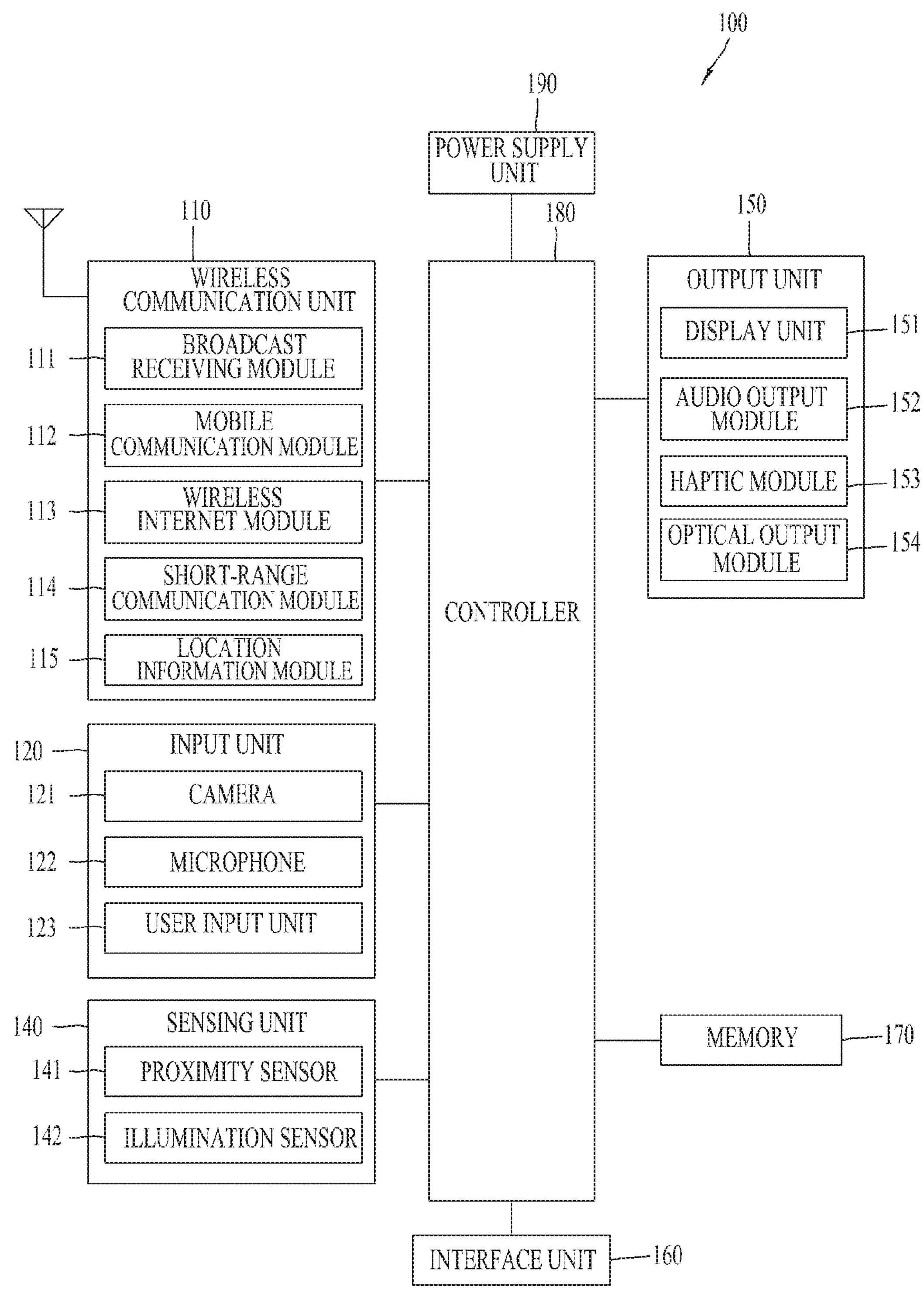
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be directly connected with the other element or intervening elements may also be present. In contrast, when an element is referred to as being “directly connected with” another element, there are no intervening elements present.

A singular representation may include a plural representation unless it represents a definitely different meaning from the context.

Terms such as “include” or “has” are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
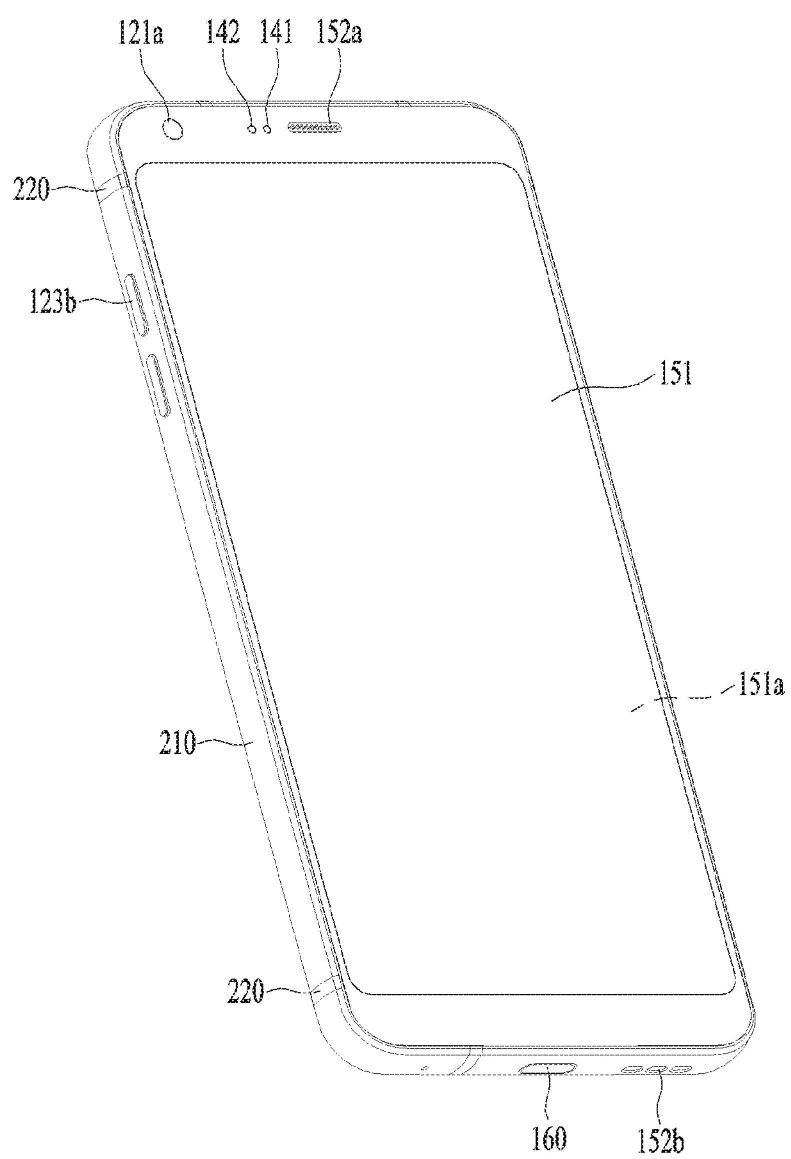
FIGS. 1B and 1C are conceptual views of one example of the mobile terminal, viewed from different directions.
Figure 1C:
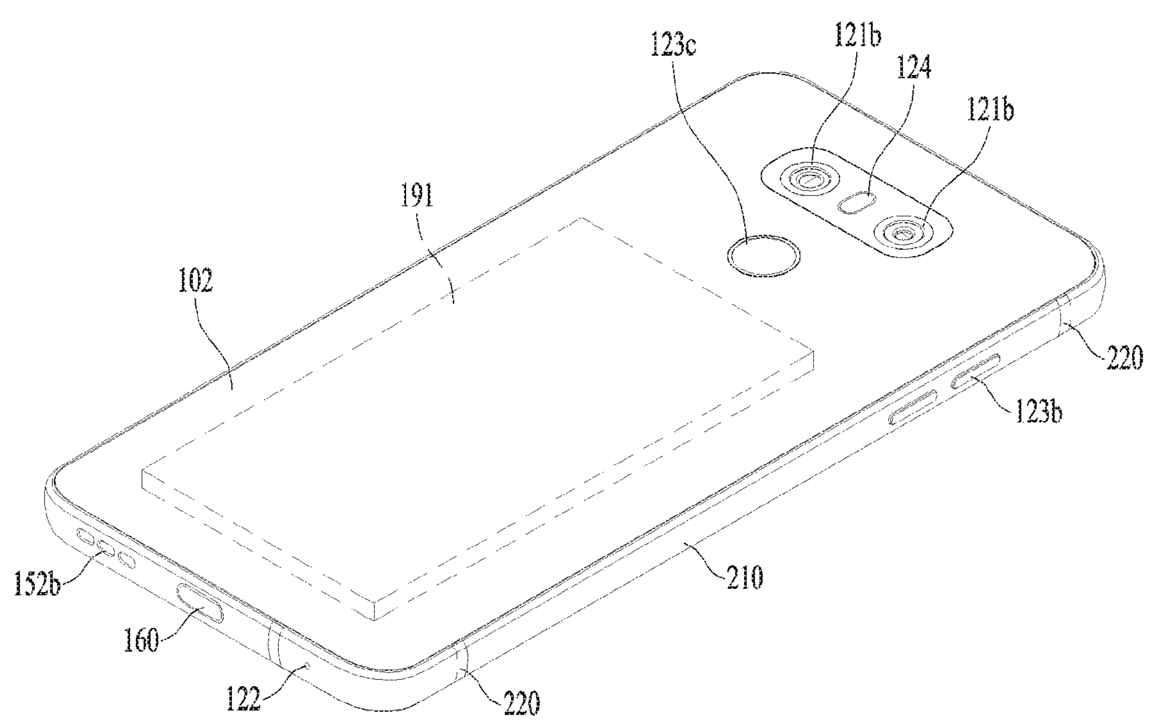

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal.

As shown in the drawing, there is a recent advent of a mobile terminal including a window 151*a* which is disposed on a front surface of the display unit may cover the overall front area, while including no front case. Such a mobile terminal may include a side case 210 formed to cover a lateral side. The window 151*a*, the side case 210 and the rear case 102 may form an inner space. As occasion occurs, some electronic components may be loaded even in the rear case 102. The electronic components which can be loaded in the rear case 102 may include a removable battery, an identity module, a memory card and the like. In this instance, a rear cover for covering the loaded electronic components may be detachably coupled to the rear case 102. Accordingly, when the rear cover is decoupled from the rear case 102, the electronic components loaded in the rear case 102 will be exposed outside.

Synthetic resin or metal is injected in a mold to fabricate such the cases 102 and examples of the metal include stainless steel (STS), aluminum (Al) and the like.

The side case 210 in accordance with the embodiments of the present disclosure may include metal and it may be used as an antenna radiator. Such the metal useable as the antenna radiator has to be a conductive material having a preset length which is proper to characteristics of a frequency for a transceived signal. accordingly, a middle area of the side case 210 made of the metal is partitioned off by a slit 220 to form a plurality of conductive members and a non-metallic material is filled in the slits 220 to use the conductive members as the antenna radiator.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the rear case 102 to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 151*b* and the second camera 121*b* are arranged in rear surface of the terminal body.

It is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies. In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (123c) may be located on the rear surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control volume level being output from the first or second audio output modules 152a or 152b, switch to a touch recognition mode of the display unit 151, and the like. The rear input unit 123c may be configured to permit touch input, a push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at most any location of the rear side of the terminal body.

Embodiments that include the rear input unit 123c may implement some or all of the functionality of the first manipulation unit 123a in the rear input unit 123c. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear case 102, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments which are associated with a control method which may be realized in the mobile terminal having the structure mentioned above will be described in reference to the accompanying drawings. In the present disclosure, that which is well-known to one of ordinary skill in the relevant art has generally been omitted for the sake of brevity.

As the multimedia function becomes important, the wireless communication technique may be performed in the mobile terminal 100 in various methods. For example, the wireless communication is performed in a short or long range or between devices. At this time, the frequency bands used in this instance are different and different antennas have to be used.

LTE which is one of the 4th generation mobile communications has emerged to support the transceiving of mass data. However, considering a trend of a wireless network user's data consumption and wide availability of Io T (Internet of Things), there are demands for new ultra-broadband mobile communication technique for transceiving mass data faster than LTE. 5th generation mobile terminal communication techniques are under development and RF techniques for 5th generation (5G) mobile communication is referred to as 'NR (New Radio)' in 3GPP (3rd Generation Partnership Project) and 'IMT (International Mobile Telecommunication)-2020' in ITU (International Telecommunications Union), which is a communication method realized in a different way from conventional LTE.

Such 5G mobile communication facilitates fast transmission of mass data and improvement of data transmission reliability. With wide-spreading of Io T (Internet of Things), the 5G mobile communication may further include a function of Io T communication supporting.

5G is a mobile communication technique of which the maximum download and the minimum download speed are 20 Gps and 100 Mbps. Also, 5G may provide 1,000,000 devices within a 1 km2 with the IoT service and facilitate free communication even in a high-speed train at the speed of 500 km/h. The download speed of 5G is 280 times faster than that of the conventional LTE, which allows a user to download a 1 GB movie in 10 seconds.

The 5G mobile communication has a remarkably improved response speed, as well as the transmission speed. When the data transmission speed shows how much data passes at once, the response speed shows how long it takes for little data to go.

The response speed of 4G becomes as fast even as 10-50 ms (millisecond, one thousandth second). The response speed of 5G becomes about 10 times faster than that of 4G. Accordingly, 5G is expected to be introduced in such fields as self-driving cars and IoT which have to transceive mass data with a central sever constantly.

5G may use frequency bands of centimeter waves (3 GHz-30 GHz) and millimeter waves (30 GHz-300 GHz). Especially, a communication method which uses signals at a frequency band of 6 GHz or less is referred to as 'Sub-6'.

Sub-6 includes N41 which uses signals at a frequency band from 2.5 GHz to 2.7 HGz and N78 which uses signals at a frequency band from 3.3 GHz to 3.8 GHz. Every country uses a different frequency band. It is necessary to provide an antenna which is capable of securing the performance in both frequency bands for the products which can be used worldwide.

Figure 2:
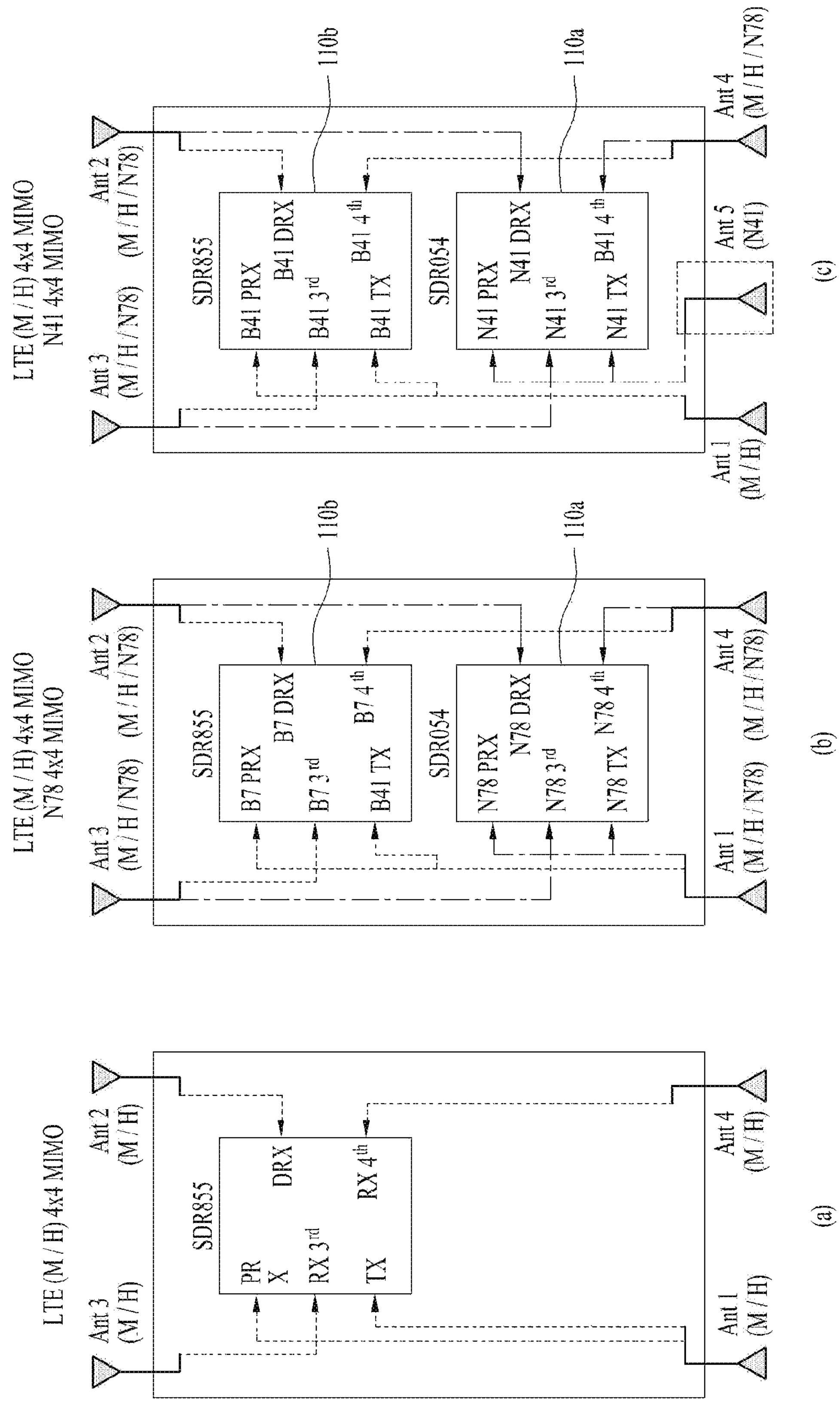
FIG. 2 is a diagram to describe arrangement of an LTE antenna and an NR antenna which are provided in the mobile terminal in accordance with the present disclosure.

FIG. 2 is a diagram to describe the arrangement of an LTE antenna and a 5th generation (5G) antenna in the mobile terminal. A conventional LTE antenna happens to have a complex structure after several structural improvements. There are increasing demands for an antenna structure configured to expand a bandwidth in a resonance frequency for broadband LTE. More specifically, it is necessary to provide a plurality of antennas or a multi-resonant antenna which may receive different frequency band signals for LTE-A (LTE-Advanced) configured to use several frequency band signals, not one-frequency-band signals.

It is necessary to provide a plurality of antennas for covering signals in all of the bands including a frequency band of 1 GHz or less (Low band), a frequency band near 2 GHz (Mid band) and a frequency band of 2.2 GHz or more (High band).

It is also necessary to provide a plurality of antennas so as to apply MIMO (Multiple Input Output). When MIMO is applied, data is transmitted in several ways between a mobile terminal and a base station via two or more antennas provided in the mobile terminal and a receiving end detects the data such that interference may be reduced and the transmission speed of each data may be enhanced effectively. Accordingly, MIMO may transmit as much data as the number of the antennas. FIG. 2 (*a*) illustrates the structure of an antenna when 4×4 MIMO is applied for LTE mobile communication. For that, four antennas are required and such four antennas may perform data-receiving (Rx.). However, there may be provided one antenna which is able to perform data-transmitting.

Typically, the antennas for the data-transmitting may be arranged in the areas which can minimize interference with other electronic components, because they are more sensitive to interference than the antenna for the data-transmitting. Also, the antennas are electrically connected with a wireless communication unit for LTE communication and able to transmit or receive signals corresponding to the resonance frequencies of the antennas, respectively.

Four or more antennas for such improved LTE mobile communication are provided and an antenna for wireless communication such as WIFI, Bluetooth and GPS may be further provided.

Even when a mobile communication method for 5G mobile communication is utilized, the equipment for 5G communication has established little and the region where 5G communication is facilitated is restricted and the conventional terminal is unable to perform 5G communication. Because of that, a telecommunication company provides a mobile communication service which uses both LTE and 5G and requires mobile terminals which are able to use such two methods.

FIG. 2 (*b*) is a conceptual diagram of the mobile terminal which further includes an antenna and a wireless communication unit so as to use a N78 signals rather than the structure shown in FIG. 2 (*a*). The mobile terminal includes a first wireless communication unit 110*a* for 5G wireless communication; and a second wireless communication unit 110*b* for LTE wireless communication. The first wireless communication unit 110*a* and the second wireless communication unit 110*b* may be loaded on the main board 181 as a chipset. For the connection between the antennas and the wireless communication units 110*a* and 110*b*, the circuit loaded on the main board 181 and the signal line connected with the main board 181 may be used.

N78 uses signals in approximately 3.5 HGz band, which means that N78 uses signals in a different band, compared with LTE. Accordingly, there is little mutual interference between the signals enough to facilitate 5G mobile communication and LTE communication, using one antenna. In other words, each of the antennas may be connected with the first wireless communication unit 110 and the second wireless communication unit 110*b* at the same time. The antenna connectable with the first and second wireless communication units 110*a* and 110*b* at the same time may be referred to as the common antenna. In this instance, an additional conductive pattern may be tuned to use two frequency bands.

FIG. 2 (*c*) illustrates the arrangement of the wireless communication and an antenna so as to perform wireless communication by using N41 signals via the antenna for LTE. The antenna in accordance with this embodiment includes five antennas, different from the above-noted embodiment. The mobile terminal may include a first wireless communication 110*a* for 5G wireless communication; a second wireless communication unit 110*b* for LTE communication; three antennas which are connectable with the first and second wireless communication units 110*a* and 110*b* at the same time; one antenna which is connectable only with the first wireless communication unit 110*a*; and another antenna which is connectable only with the second wireless communication unit 110*b*.

The N41 signal uses a band of 2.7 GHz such that there might be enough of an overlapped section with a signal in B41 band of 2.5 GHz for LTE to cause interference. A receiving antenna may be used for both the N41 band signal and the B41 band signal. In contrast, such interference might cause an error in a transmitting antenna. Accordingly, an independent antenna which is connectable only with the first wireless communication unit 110*a* may be provided. For easy description, the signal used for wireless communication by the first wireless communication unit 110*a* may be referred to as the first signal (5G signal) and the signal used for wireless communication by the second wireless communication unit 110*b* may be referred to as the second signal (LTE signal).

Figure 3A:
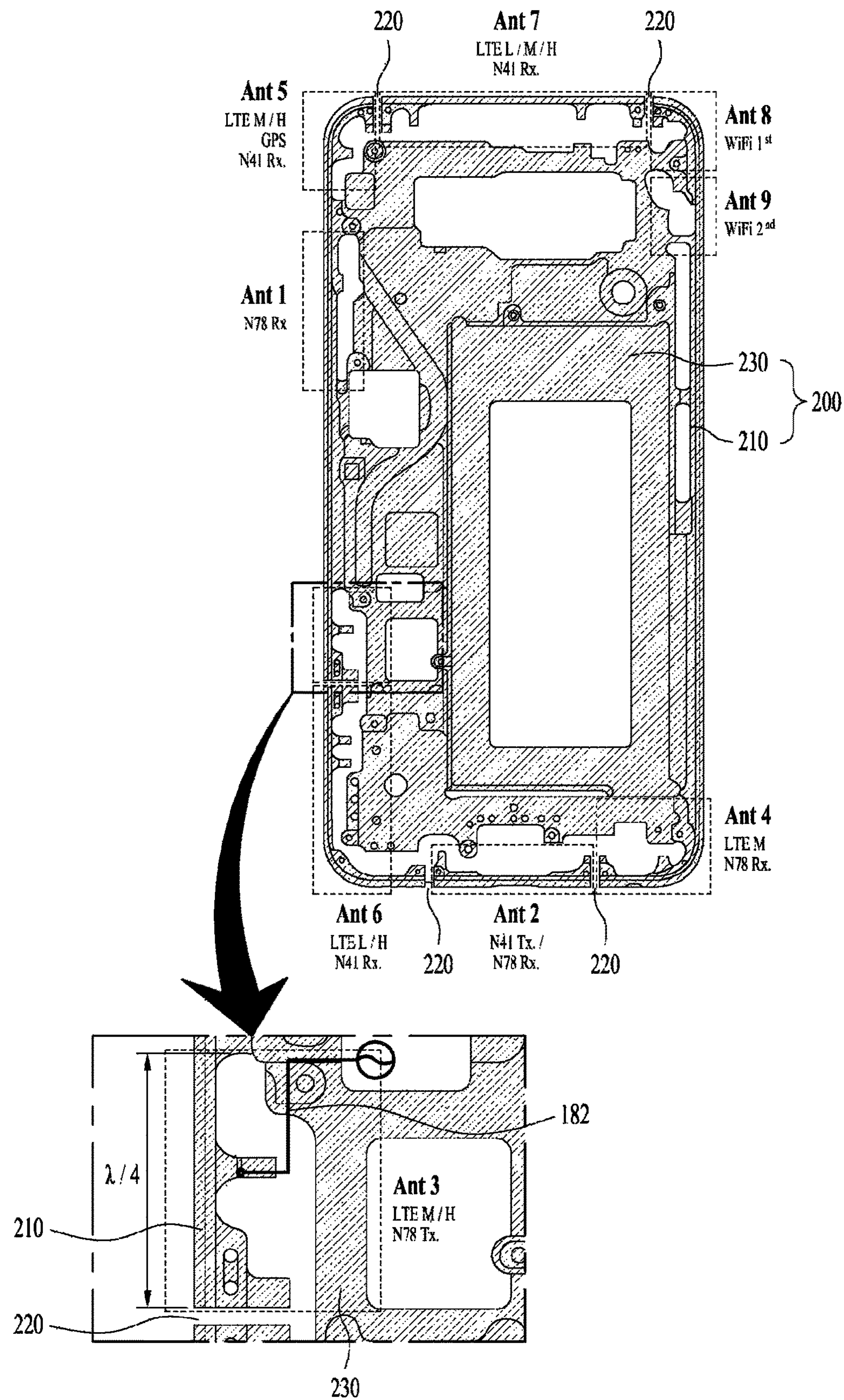
FIGS. 3A and 3B are diagrams illustrating one embodiment of an independent antenna provided in the mobile terminal.
Figure 3B:
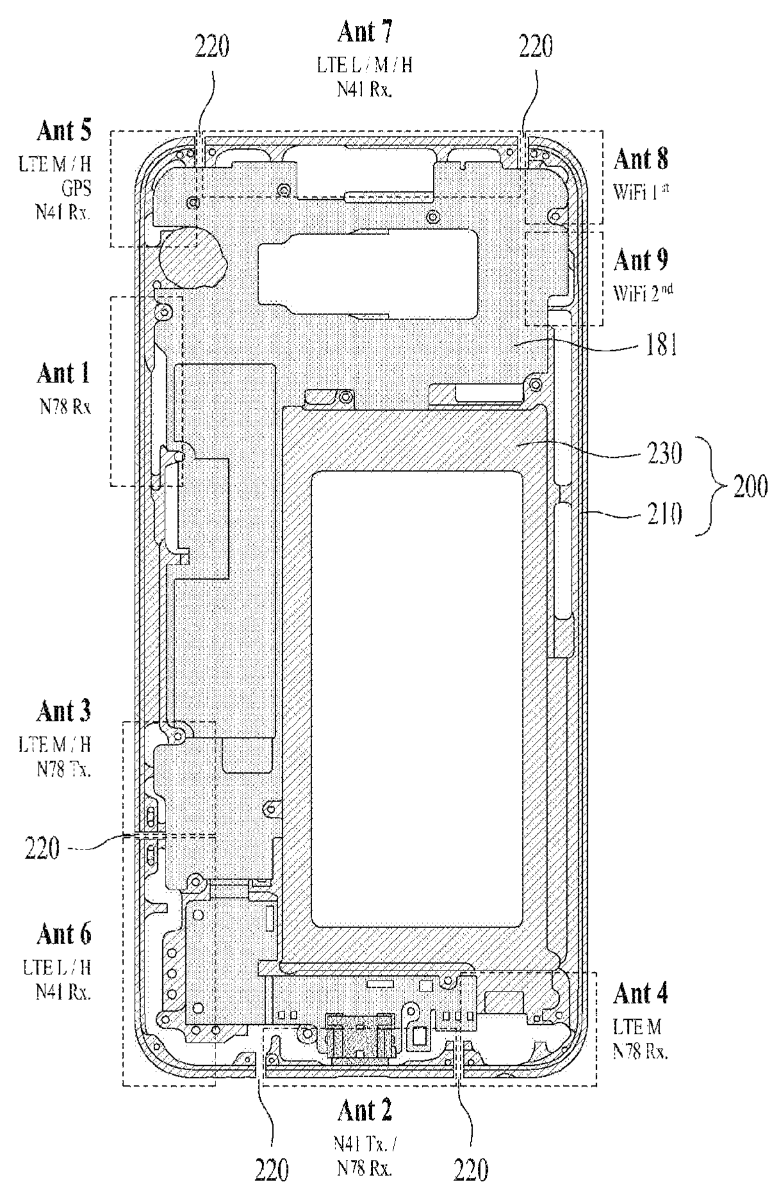

Hereinafter, the antennas applied to the actual mobile terminal will be descried in detail. FIG. 3*a* is a plane view illustrating a middle frame 200 of the mobile terminal 100 and FIG. 3*b* is a diagram illustrating that the main board 181 is disposed in the middle frame 200 shown in FIG. 3*a*.

Diverse electronic components are loaded in the limited inner space of the mobile terminal 100 such that such the inner space should be divided and used. The battery which occupies the largest volume of the inner space may be arranged in a predetermined portion of the inner space and the other components including the main board 181, the camera 121, the audio output unit 152, the interface unit 160 and the like may be loaded in the other space.

In recent, a design realized by using metal is applied to a side case 210 which defines lateral surfaces of the mobile terminal. The lateral structure of the side case 210 realized by using metal is good in terms of design. However, the internal electronic components of the mobile terminal 100 may be surrounded by the metal case and the wireless communication performance of the antenna provided as the device using electromagnetic waves, especially, might be deteriorated by the metal case.

When solving the disadvantage, the metal side case of the mobile terminal may be used as the antenna in terms of the space for the antenna arrangement. As shown in FIG. 3*a*, the mobile terminal may further include a middle frame 200. The middle frame 200 may include a supporting portion 230 provided on a rear surface of the display unit in the mobile terminal and configured to support the display unit 151 and reinforce the strength and rigidity of the mobile terminal 100; and a side portion 210 integrally formed with the supporting portion 230. In other words, the side case and the supporting portion arranged in the rear surface of the display unit are integrally formed as one body.

The middle frame 200 may have a conductive material such as magnesium or aluminum or the like and a predetermined rigidity strong enough to reinforce the strength and rigidity of the mobile terminal 100. The supporting unit 230 may be the largest conductive element in the mobile terminal and then employed as a ground. Accordingly, the grounding may be facilitated via the supporting unit 230. The side portion 210 may be spaced a preset distance from the supporting portion 230 and partially connected with the supporting portion 230. To use the side portion 210 as the antenna, the side portion 220 may be divided into slits 220 as a plurality of conductive members. Such conductive members may be connected and grounded to a ground of the main board 181 and used as antennas which are supplied the electric power via a power supply line (182, see FIG. 4).

It is necessary to provide several conductive members so as to realize the plurality of antennas configured to transceiving the first signal and the second signal. Accordingly, four or more slits may be provided.

The antenna has to be formed a half or a fourth times longer than the frequency of the communication signal so as to resonate with a signal desired to receive. Ends of the antenna may be connected with the supporting portion 230 or the ground to be grounded or divided by the slits 220. When connected with the supporting portion 230 or the ground of the main board 181, both ends of the antenna are grounded only to realize a closed slot antenna. When one end is grounded and the other end of the antenna is open by the slot 220, an open slot antenna may be realized.

The closed slot antenna may have a corresponding length to one half of the wavelength of the signal desired to receive and the open slot antenna may have a corresponding length to one fourth of the wavelength. The open slot antenna may be shorter than the closed slot antenna and it has the open end which allows frequency tuning. Accordingly, the closed slot antenna may easily realize the antenna having a multi-resonance frequency.

The side portion 210 may functionally serve as the antenna but it defines some part of the exterior appearance of the mobile terminal only to be restricted in terms of design. Considering the wavelength of the received signal, it is difficult to form the slit freely and the number of the slits 220 is limited in terms of design. The side portion 210 of the mobile terminal shown in FIG. 3*a* includes two slits 220 provided in an upper area; two slits provided in a lower area; and one slit 220 provided in a lateral area. The space and the slits 220 between the side portion 210 and the supporting portion 210 may be filled with an injection-molded material 240 which is a non-conductive material.

FIGS. 3*a* and 3*b* illustrate the area of the side portion which is used as the antenna. When the mobile terminal is held in the hand by the user, the performance of the terminal might be deteriorated. Accordingly, considering the interference with other electronic components, the antenna may be intensively arranged in lower and upper areas as possible.

There are five antennas (Ant3, Ant4, Ant5, Ant6 and Ant6) which are connected with the second wireless communication unit for conventional LTE communication. Each of the antennas may have one or more resonance frequencies so as to transceive signals in different frequency bands. For example, the left-uppermost antenna (Ant5) may be configured to receive signals in the Mid band and the High band for LTE wireless communication and also configured to be used for GPS signal. The LTE communication may realize MIMO with respect to signals in three frequency bands and uses a plurality of antennas.

Some of the antennas may be connected with the first wireless communication unit to be used as the antenna for the 5G signals (the first signal). In other words, the antennas may be connected with the first and second wireless communication units simultaneously and commonly used as the antenna for the two communication methods. Hereinafter, the antennas may be referred to as the common antennas.

When performing wireless communication by using one first signal in N78 band (3.5 GHz) out of the first signals, Ant3 and Ant4 may be used as the common antennas. At this time, an additional conductive pattern may be connected or a switch or matching circuit may be further provided and the frequency tuning may be then performed to receive all of the signals in different bands.

As mentioned above, the open slot antenna may be easily tuned into the antenna having the multi-resonance frequency such that the common antenna may be formed as the open slot antenna, in other words, the antenna having the slot formed in a predetermined area. Rather than the antenna used by the conventional second wireless communication unit, an independent antenna which is connectable only with the first wireless communication unit may be further provided. In this embodiment, the independent antenna may include a first antenna (Ant1) arranged in the lateral surface of the mobile terminal and a second antenna (Ant2) arranged in the lower end of the mobile terminal.

Figure 4:
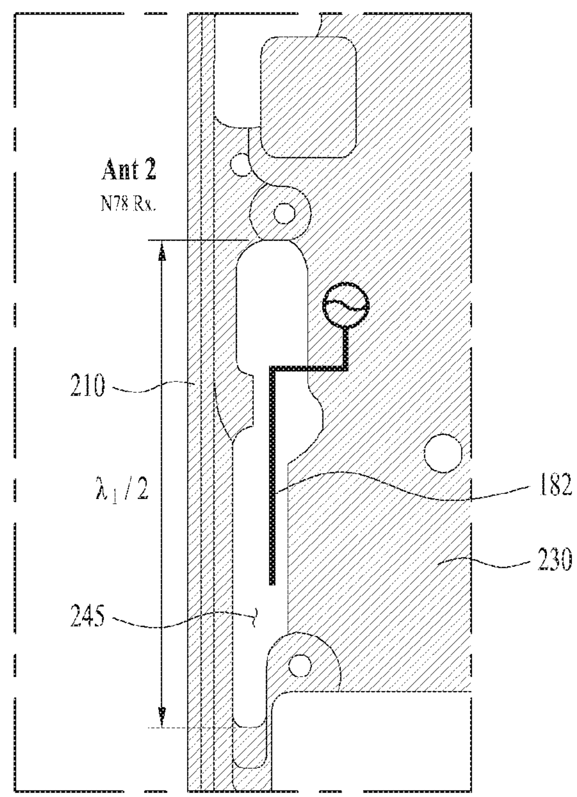
FIG. 4 is a diagram illustrating one embodiment of an independent antenna provided in the mobile terminal.
Figure 4:
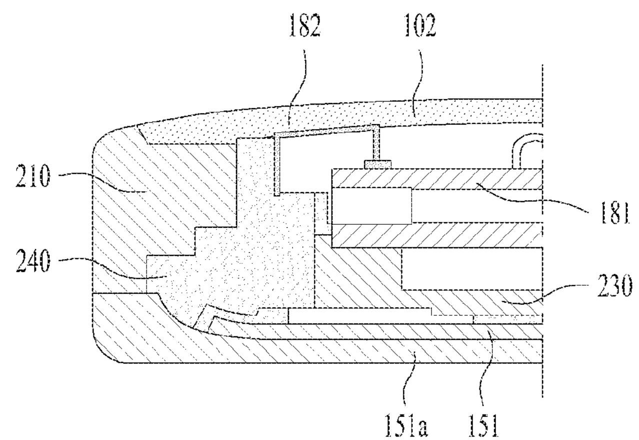

FIG. 4 is a diagram illustrating one embodiment of the independent antenna provided in the mobile terminal 100. FIG. 4 (*a*) is a conceptual diagram to describe the arrangement of a feeding line 182 electrically connected with the middle frame 200 and the first antenna (Ant1). FIG. 4 (*b*) is a sectional diagram of the first antenna (Ant1).

Referring to FIG. 4 (*a*), the first antenna (Ant1) of the illustrated embodiment is the closed slot antenna. The length of the closed slot antenna may be one half of the wavelength (λ) of the received signal. The length of the closed slot antenna may be differentiated according to the effect of peripheral electronic components and the permittivity of the injection-molded material 240 filled in the slot 245 provided between the supporting portion 230 and the side portion 210.

The feeding line 182 of the first wireless communication unit 110*a* is spaced apart from the side portion 210 as shown in FIGS. 4 (*a*) and (*b*), not directly connected with the side portion 210, such that it may feed electricity in a coupling method. Even unless the feeding line 182 is directly connected with the first antenna (Ant1), the electric field formed by the feeding line 182 may allow electric currents to flow to the first antenna (Ant1) to supply the electric power. The length of the closed slot antenna is not precisely divided and the closed clot antenna can perform more stable wireless communication than the open slot antenna such that it can use the coupling type feeding.

As shown in FIG. 4 (*b*), the coupling type feeding line may be arranged in contact with an inner surface of the injection-molded material 240 filled in the slots and have no connection structure (e.g., a C-clip) for directly contacting with the side portion 210. Accordingly, it is easy to realize the coupling type feeding line and the coupling type may reduce the number of materials enough to secure the space easily.

Figure 5:
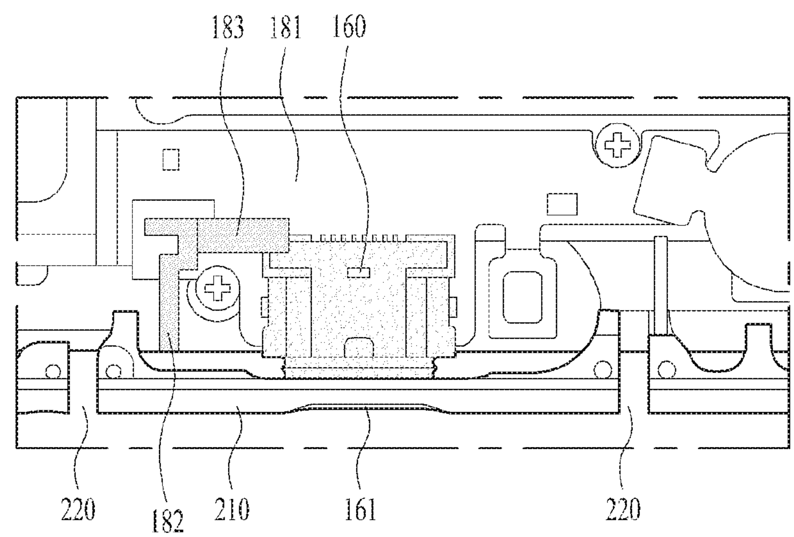
FIG. 5 is a diagram illustrating another embodiment of the independent antenna provided in the mobile terminal.
Figure 5:
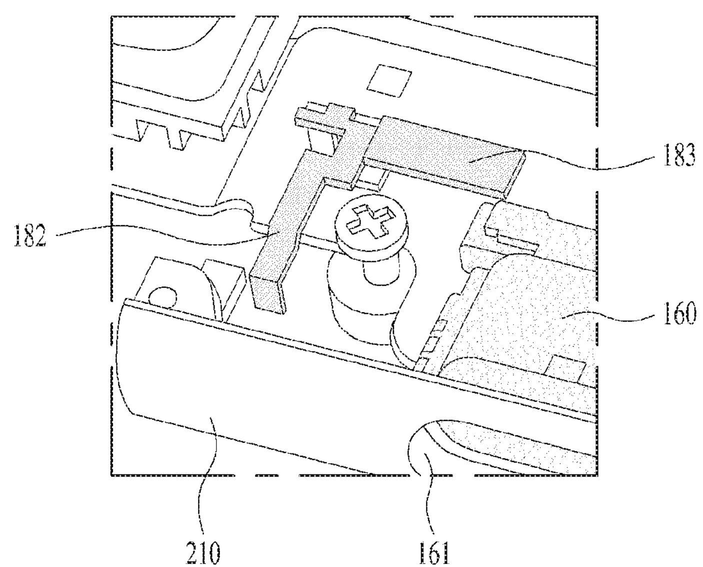
Figure 6:
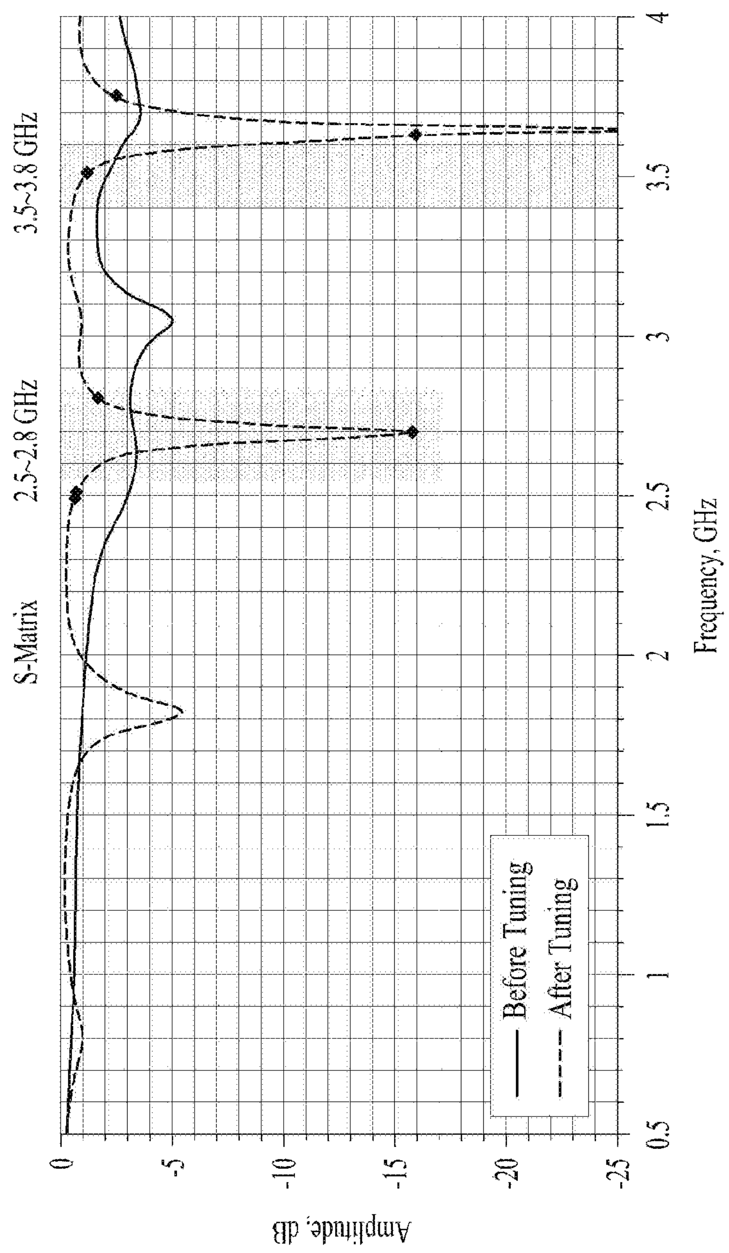
FIG. 6 illustrates a graph and a table showing the performance of the independent antenna shown in FIG. 5.

FIG. 5 is a diagram illustrating another embodiment of the independent antenna provided in the mobile terminal. FIG. 6 illustrates a graph and a table showing the performance of the independent antenna shown in FIG. 5. This embodiment of the independent antenna is the second antenna (Ant2) using a conductive member of which one end and the other end are divided by the slits and interface unit 160 connected with a charger or an external terminal and configured to transceive data is arranged near the independent antenna. A connector hole 161 may be formed in the side portion 210 and a connector for connecting an external power supply source or an external terminal to the mobile terminal may penetrate the connector hole to be inserted in the interface unit 160.

A feeding line may be arranged as shown in FIG. 5 (*a*) to apply an electric power corresponding to the first signal to the second antenna in accordance with this embodiment. The feeding line 182 in accordance with this embodiment is spaced apart from the side portion 210 as shown in FIG. 5 (*b*), not directly connected with the side portion 210, such that it may feed electricity in a coupling method.

Referring to FIGS. 3*a* and 3*b* again, an antenna for receiving the signal in the N41 band may be provided in accordance with one embodiment. A second antenna (Ant2) and fifth through seven antennas (Ant5~Ant7) are connected with the first wireless communication unit 110*a* and configured to receive a signal in N41 band. fifth through seven antennas (Ant5~Ant7) may be also connected with the second wireless communication unit 110*b* and used in the LTE wireless communication and the 5G wireless communication as the common antenna simultaneously.

The second antenna may be used as the antenna for the above-noted N78 and the independent antenna connected only with the first wireless communication unit 110*a*. However, the second antenna needs structural improvement to receive signals in two frequency bands. Referring to FIG. 5, a branch pattern 183 connected with the feeding line 182 may be further provided. The branch pattern 183 may effectively facilitate the increase of the antenna length. Referring to FIG. 6, the branch pattern 183 is further provided and then the multi-resonance occurs in the band from 2.5 GHz to 2.8 GHz and the band from 3.5 GHz to 3.8 GHz.

In the drawing, Rx means the antenna only for receiving and Tx means the antenna for both receiving and transmitting. The frequency of the N41 band is overlapped with that of the LTE B41 (2.5 GHz) signal such that the antenna (Tx Antenna) for transmitting the signal may be the independent antenna for transmitting only the first signal. Accordingly, the first wireless communication unit 110*a* in accordance with the present disclosure may transmit the N41 signal by using the second antenna shown in FIG. 6.

The second antenna in accordance with this embodiment is able to perform the multi-resonance and receive not only the N78 band signal but also another N41 band signal. A communication frequency band is variable in accordance with the country and the mobile communication company. When receiving the signals in the N41 band and the N78 band, the antenna can be advantageously used in any country without the communication company limit.

It is shown that the first wireless communication unit 110*a* of the mobile terminal in accordance with this embodiment is able to receive the N41 band signal and the 78 band signal. However, in case of using only one band, a predetermined number of the antennas may not be electrically connected with the first wireless communication unit 110*a*.

The side portion 210 arranged in the lower end of the mobile terminal may be used as a cap sensor configured to sense whether the user's body approaches the mobile terminal. The cap sensor is provided to sense variation of an electric field which is formed between a conductor and itself, similar with a touch sensor. When an object which is able to affect the electric field such as a human body approaches the mobile terminal, there is variation of the electric field formed between the conductor and the cap sensor.

The control unit may determine whether the mobile terminal is located near the user based on the variation of the electric field. When it is determined that the user approaches the mobile terminal, the control unit may reduce the intensity of the signal radiated from the antenna and then the effect on the human body. SAR (Specific Absorption Rate) is regulated which is the specific absorption rate of electromagnetic waves to a unit mass. To satisfy the SAR standards, the first and second wireless communication units 110*a* and 110*b* may lower the intensity of the signals so as to lower the figure of the electromagnetic waves to the SAR standards.

Figure 7:
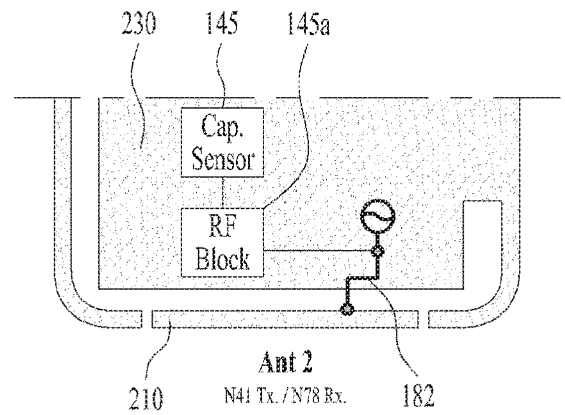
FIG. 7 is a diagram illustrating diverse embodiments of the arrangement of the independent antenna shown in FIG. 5 and a cap sensor.
Figure 7:
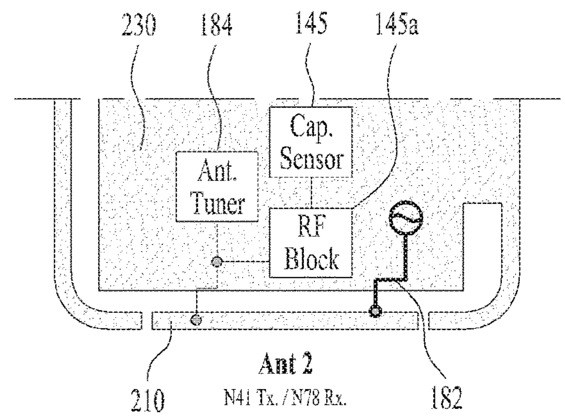
Figure 7:
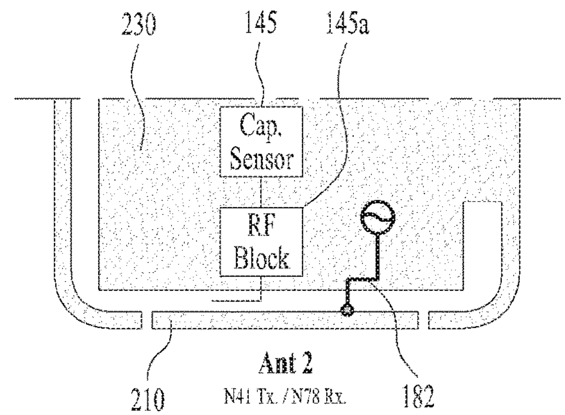

FIG. 7 is a diagram illustrating the arrangement of the independent antenna and the cap sensor in accordance with diverse embodiments. The cap sensor may be directly connected with the side portion 210. In the present disclosure, the side portion 210 arranged in the lower end of the mobile terminal is used as the independent antenna. The cap sensor may be electrically connected with the side portion 210. When the cap sensor is connected with the feeding line independently, two connection structures have to be provided and the number of the required components increases. It is advantageous to connect them with each other in the main board without auxiliary connection structures.

As shown in FIG. 7 (*a*), a direct-connection method may be used to connect the cap sensor with the feeding line 182 for feeding the first antenna so as to be electrically connected with the side portion 210. As an alternative embodiment, as shown in FIG. 7 (*b*), the cap sensor may be electrically connected with the side portion 210 as a parasite on the branch pattern additionally provided for the antenna tuning or the structure for the connection with the matching circuit 184. As a further embodiment as shown in FIG. 7 (*c*), the cap sensor may be connected with the side portion 210 in the coupling method.

The cap sensor configured to function as the cap sensor and receive the first signal simultaneously may include a RF block configured to cut off a corresponding signal to a RF signal. The RF block may cut off the RF signal and then able to minimize the effect on the transceiving of the RF signals. The RF block may be arranged between the cap sensor and the side portion 210 or the connected area of the feeding line 182 or the branch pattern.

Figure 8:
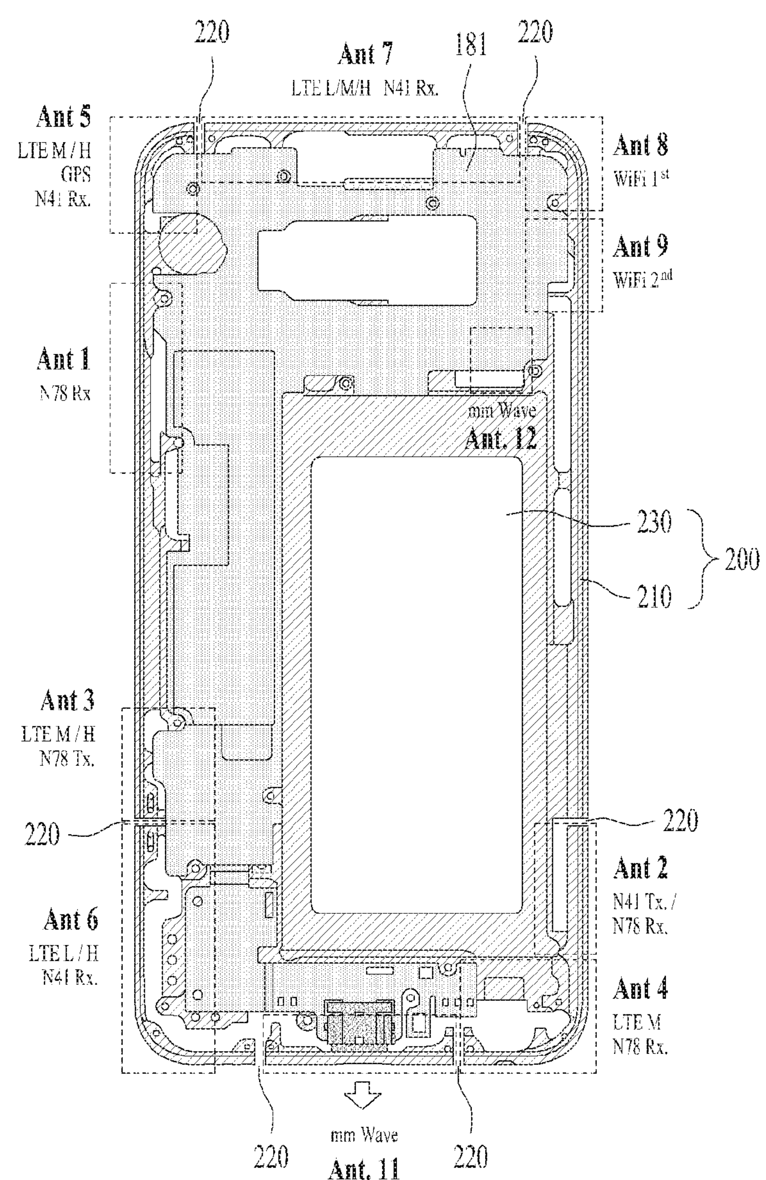
FIG. 8 is a diagram illustrating another embodiment of the antenna arrangement in the mobile terminal.

FIG. 8 illustrates one embodiment of the antenna arrangement in the mobile terminal. In this embodiment, one more slit may be formed in a right area such that the second antenna arranged in the lower end of the mobile terminal in the embodiment of FIG. 3*a* is moved to a side area of the mobile terminal.

The second antenna arranged in the side area of the mobile terminal may be the open slot antenna which has the disadvantage of the increased slit number. However, the lower side portion 210 of the mobile terminal may not be used as the antenna for 5G sub-6 wireless communication so that the space for the antenna can be used.

As mentioned above, the 5G wireless communication may use not only cmWave but also mmWave. mmWave may transmit a signal in a specific direction in a beam forming method so as to perform effective signal transmission. For the beam forming, an array antenna including a plurality of antenna patches may be used as the antenna for mmWave.

The antenna (Ant11) for the mmWave may be arranged in the lower end of the mobile terminal. The mmWave has directionality. When a beam forming direction is toward the base station, the wireless communication performance becomes improved. When the beam forming direction is not toward the base station, the wireless communication performance becomes deteriorated noticeably. There may be a plurality of antennas (Ant11 and 12) for the mmWave.

As shown in FIG. 8, an antenna for transmitting the mmWave signal may be further provided. The additional antenna (Ant12) may be spaced apart from the antenna (Ant11) for the mmWave arranged in the lower end of the mobile terminal. In this instance, the additional antenna may be arranged under Ant8 and Ant9 so as to avoid the interference with the antennas (Ant8 and Ant9) for WIFI.

Figure 9:
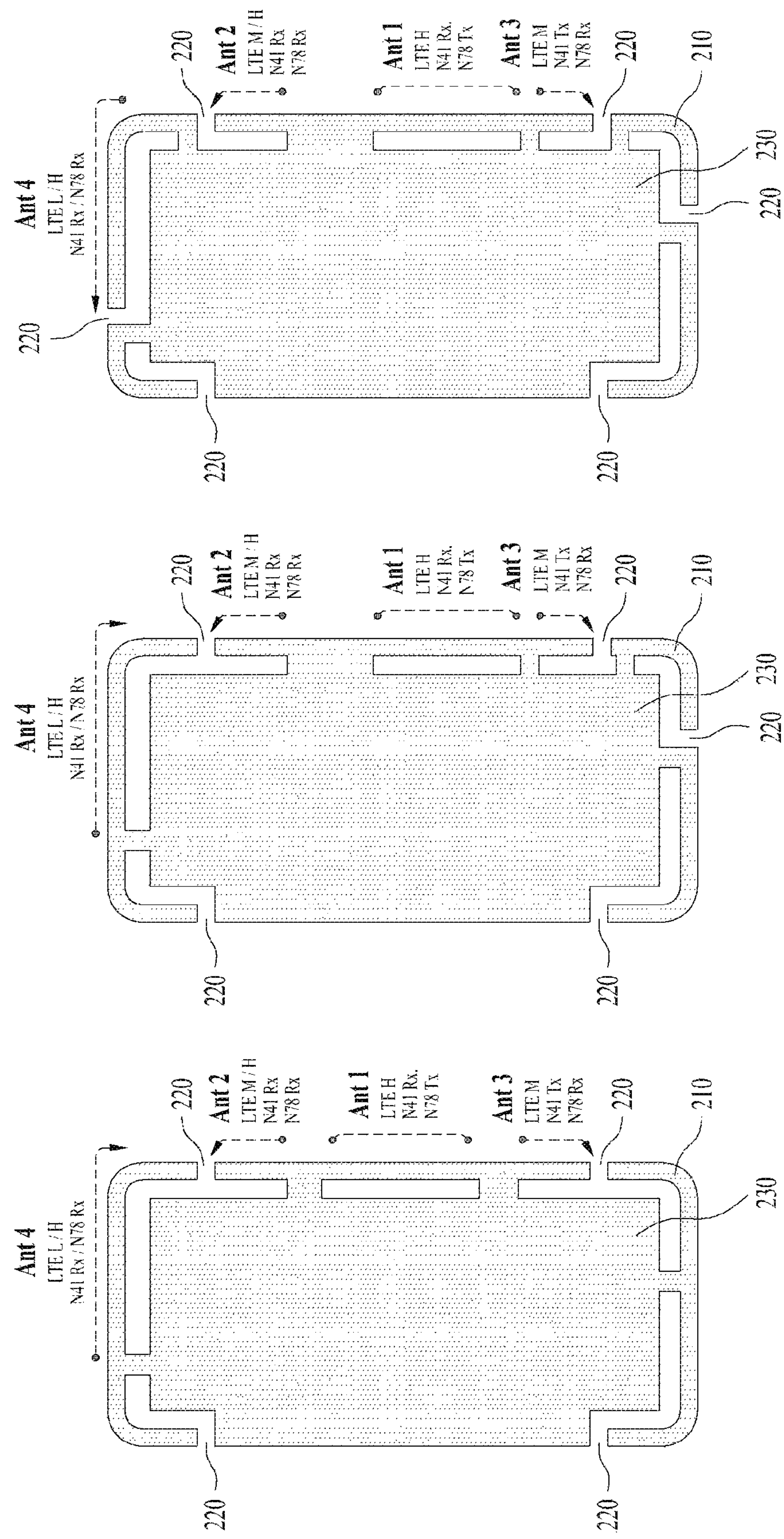
FIG. 9 is a diagram illustrating a further embodiment of the antenna arrangement in the mobile terminal.

FIG. 9 illustrates a further embodiment of the antenna arrangement in the mobile terminal 100. FIGS. 9*a* and 9*b* illustrate embodiments according to the number of the slits 220 formed in the side portion 210. The first wireless communication unit 110*a* uses the side portion 210 located in the lateral area so that the antenna connected with the first wireless communication unit 110*a* can be formed similarly even when more slits are formed in the lower and upper ends.

The antenna using the side portion 210 electrically connected with the first wireless communication unit 110*a* may be configured of only the common antenna according to this embodiment. The antenna may include three common antennas (Ant1, Ant2 and Ant3) arranged in the lateral area and two common antennas arranged in upper and lower areas.

FIG. 9 (*a*) shows that two slits 220 are arranged in the upper area and two slits are arranged in the lower area. FIG. 9 (*b*) illustrates that one more slit 220 is formed in the lower area. FIG. 9 (*c*) illustrates that one more slit 220 is formed in the upper area of the middle frame 220. Four common antennas may receive all of the first and second signals. The second antenna (Ant2) configured to transmit the N41 band signal may receive the LTE signal (the second signal) in the Mid band and there may be then no interference with the N41 band such that the common antenna may transmit (Tx) the first signal.

As mentioned above, the mobile terminal in accordance with the present disclosure may include the common antenna which is connectable with the two or more wireless communication units in the limited area and configured to receive the different signals. Accordingly, the antennas for the LTE communication and the 5G communication may be arranged in the limited space.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:

a display unit configured to display information;

a main board provided at a rear surface of the middle frame and comprising a ground;

a first wireless communication unit on the main board and configured to transceive a first signal;

a second wireless communication unit on the main board and configured to transceive a second signal;

a rear case covering a rear surface of the main board, at least one first antenna electrically connected to the first wireless communication unit and the second wireless communication unit and configured to receive the first signal and the second signal; and at least one second antenna electrically connected to the second wireless communication unit and configured to transceive the second signal.

2. The mobile terminal of claim 1, wherein:

the first signal is a NR (New Radio) signal; and the second signal is a LTE (Long Term Evolution) signal.

3. The mobile terminal of claim 1, wherein:

the first signal has a frequency band between 2.5 GHz and 6 GH; and the second signal has a frequency band of 2.7 GHz or less.

4. The mobile terminal of claim 1, wherein at least one end of each of the at least one first antenna comprises a slit.

5. The mobile terminal of claim 1, wherein the side portion comprises at least four slits.

6. The mobile terminal of claim 1, wherein the first antenna comprises a first resonance frequency corresponding to the first signal and a second resonance frequency corresponding to the second signal.

7. The mobile terminal of claim 1, wherein the at least one second antenna is provided in a lower area of the mobile terminal and further comprising a cap sensor electrically connected to the at least one second antenna.

8. The mobile terminal of claim 7, wherein:

the at least one second antenna comprises a connector hole; and the connector hole comprises an interface unit having a connector inserted therein.

9. The mobile terminal of claim 7, further comprising:

a Radio Frequency (RF) block between the cap sensor and the at least one second antenna and configured to cut off an RF signal applied to the cap sensor.

10. The mobile terminal of claim 7, wherein the cap sensor is connected to the at least one second antenna via a direct connecting method to directly connect a signal line connected to the cap sensor with the at least one second antenna, a coupling connecting method to arrange the signal line near the at least one second antenna, a connecting method to connect the cap sensor with a feeding line connected with the first wireless communication unit or an indirect connecting method to connect the cap sensor to a branch pattern connected to the at least one second antenna.

11. The mobile terminal of claim 1, further comprising a branch pattern either extending from a feeding line connecting the at least one second antenna to the first wireless communication unit or connected to the at least one second antenna, wherein the at least one second antenna comprises a plurality of resonance frequencies.

12. The mobile terminal of claim 11, wherein the feeding line is connected to the at least one second antenna via a coupling method.

13. The mobile terminal of claim 1, wherein:

the at least one second antenna forms an open slot antenna having a first end connected to the supporting portion; and the first end has a slit such that one open end is formed with the supporting portion.

14. The mobile terminal of claim 1, wherein the first signal is received by both the at least one first antenna and the at least one second antenna and then transmitted by the at least one second antenna.

15. The mobile terminal of claim 1, wherein the at least one second antenna is:

physically connected to the supporting portion at a first point and to the supporting portion or the ground at a second point; and electrically connected to the second wireless communication unit between the first point and the second point such that the at least one second antenna receives the first signal.

16. The mobile terminal of claim 15, wherein:

the at least one second antenna is provided at a left or right lateral area of the mobile terminal; and a length between the first point and the second point is one half a wavelength of the first signal.

17. The mobile terminal of claim 1, further comprising an array antenna that does not overlap the at least one first antenna and the at least one second antenna.

18. The mobile terminal of claim 17, wherein the array antenna receives a mmWave signal.

19. The mobile terminal of claim 1, further comprising a middle frame comprising a supporting portion and a side portion provided around the supporting portion to define a lateral external appearance, the supporting portion supporting a rear surface of the display unit, and wherein the side portion comprises at least one slit forming a plurality conductive members, and wherein the plurality conductive member comprises the at least one first antenna.

20. The mobile terminal of claim 19, wherein the plurality of conductive members comprise at least two common antennas.

* * * * *